US007782987B2

(12) United States Patent
Jonsson (10) Patent No.: US 7,782,987 B2
(45) Date of Patent: Aug. 24, 2010

(54) METHOD AND APPARATUS FOR RECEIVED SIGNAL QUALITY ESTIMATION

(75) Inventor: Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1603 days.

(21) Appl. No.: 10/799,322

(22) Filed: Mar. 12, 2004

(65) Prior Publication Data

US 2005/0201499 A1    Sep. 15, 2005

(51) Int. Cl.
*H04L 5/12* (2006.01)
(52) U.S. Cl. ............... 375/348; 375/148; 375/340; 375/346; 455/114.2; 455/296
(58) Field of Classification Search ............... 375/346, 375/348, 148, 340; 455/114.2, 296
See application file for complete search history.

(56) References Cited

U.S. PATENT DOCUMENTS

| 5,499,272 | A  | * | 3/1996  | Bottomley ............ 375/347 |
| 6,441,786 | B1 | * | 8/2002  | Jasper et al. ........... 342/383 |
| 6,975,672 | B2 | * | 12/2005 | Bottomley et al. ...... 375/148 |
| 6,985,518 | B2 | * | 1/2006  | Nielsen .................. 375/152 |
| 7,430,257 | B1 | * | 9/2008  | Shattil .................... 375/347 |
| 2002/0080863 | A1 | * | 6/2002 | Nielsen .................. 375/152 |
| 2002/0157046 | A1 |   | 10/2002 | Kyosti et al. |

(Continued)

FOREIGN PATENT DOCUMENTS

| CN | 1411634 A | 4/2003 |
| GB | 0318529.5 | 8/2003 |
| JP | 2002-344383 | 5/2001 |
| JP | 2002/344383 | 11/2002 |

OTHER PUBLICATIONS

Bottomley et al, "A Generalized Rake Receiver for Interference Suppression", IEEE Journal on selected areas in communications, vol. 18, No. 8, Aug. 2000.*

(Continued)

*Primary Examiner*—David C Payne
*Assistant Examiner*—Leon Flores
(74) *Attorney, Agent, or Firm*—Coats & Bennett, P.L.L.C.

(57) ABSTRACT

A processing circuit and method generate signal quality estimates based on scaling measured inter-symbol interference (ISI) in a received signal according to a cancellation metric corresponding to ISI cancellation performance of the receiver. By accounting for ISI cancellation performance of the receiver based on a simple scaling metric, accurate received signal quality measurements are obtained in a manner that accounts for un-cancelled ISI in the received signal without requiring use of potentially complex multipath combining weight calculations in the signal quality calculation. Signal quality estimation results may be used for sending corresponding Channel Quality Indicators, communication link transmit power control commands, etc. In some embodiments, the cancellation metric is maintained as a dynamic value based on measured ISI cancellation performance, while in other embodiments the cancellation metric comprises a pre-configured value stored in memory, for example.

44 Claims, 5 Drawing Sheets

U.S. PATENT DOCUMENTS

2003/0045318 A1* 3/2003 Subrahmanya .............. 455/522
2003/0053526 A1* 3/2003 Reznik ...................... 375/148
2003/0218999 A1 11/2003 Ren et al.
2003/0223489 A1 12/2003 Smee et al.

OTHER PUBLICATIONS

Higuchi, et al; Experimental Evaluation of Combined Effect of Coherent Rake Combining and SIR-Based Fast Transmit Power Control for Reverse Link of IDS-CDMA Mobile Radio; IEEE Journal on Selected Areas in Communications, vol. 18, No. 8, Aug. 2000; 10 pgs.

Gunaratne et al.; Comparison of SIR Estimation Techniques for Closed-Loop Power Control in the W-CDMA System, European Wireless Conference, Feb. 25-28, 2002; 5 pgs.

Gunaratne et al: "Comparison of SIR Estimation Techniques for Closed-Loop Power control in the W-CDMA System," European Wireless Conference, Florence, Italy, Feb. 25-28, 2002, pp. 911-915.

* cited by examiner

METHOD AND APPARATUS FOR RECEIVED SIGNAL QUALITY ESTIMATION

BACKGROUND OF THE INVENTION

The present invention generally relates to communication signal processing and particularly relates to measuring received signal quality.

Many types of communication systems employ some form of transmit power control, wherein the transmit power of a transmitter is controlled explicitly or implicitly in response to feedback from a remote receiver. For example, interference limited systems, such as Code Division Multiple Access (CDMA) wireless communication networks, use forward and reverse link power control to control interference and promote efficient use of available transmit power resources.

With respect to a given mobile terminal, forward link power control comprises receiving power control commands from the mobile terminal at a supporting network base station and adjusting the forward link transmit power allocated for serving that mobile terminal up and down according to the incoming commands. If the received forward link signal quality at the mobile terminal is below a targeted value, the mobile terminal sends one or more up commands and, conversely, if the quality is above the target, it sends one more down commands. Such comparisons and the corresponding command generation typically occurs at a relatively high rate, e.g., hundreds of times per second, such that the transmitting base station(s) continually adjust the forward link power for the mobile station to maintain targeted signal quality. This closed-loop mode of power control is referred to as "inner-loop" power control.

"Outer-loop" complements the above inner loop operations by adding a second but typically much slower adjustment mechanism that adjusts the inner-loop control target based on some other received signal metric. For example, the mobile station may evaluate the Frame Error Rate (FER), or evaluate some equivalent metric, of a received forward link traffic channel as the basis for outer loop control. Thus, if the FER is too high with the current received signal quality target, the outer-loop control mechanism adjusts the inner loop target upward, by 1 dB for example. Conversely, if the FER is below the acceptable error rate, the outer-loop control mechanism might adjust the inner-loop target downward.

With the above inner-loop and outer-loop control mechanisms, the receiving mobile station ensures that the network transmitters dynamically adjust their transmit powers as needed to maintain targeted signal quality at the mobile terminal over changing radio conditions, and ensures at the same time that the transmitters do not transmit at more power than is needed. Similar inner-loop and outer-loop power control may be implemented at the network base stations for the reverse links between those base stations and respective ones of the mobile terminals being supported by them. As with the forward link, reverse link power control ensures that each mobile station transmits with no more power than is needed to maintain targeted received signal quality (and data error rates) at the supporting base stations.

While the above link power control is straightforward in description, in practice such power control can be complicated by the requirement to timely and accurately determine the received signal quality at the inner-loop power control rate. For example, Wideband CDMA (WCDMA) specifications require mobile terminals to compute received signal quality and return corresponding Transmit Power Control (TPC) commands (bits) relatively early in each transmit slot. Because signal quality in such environments depends on the characteristics of multipath signal reception from one or more network transmitters, determination of actual received signal quality can be computationally complex.

SUMMARY OF THE INVENTION

The present invention comprises a method and apparatus processing to generate signal quality estimates based on scaling measured inter-symbol interference (ISI) in a received signal according to a cancellation metric corresponding to ISI cancellation performance of the receiver. By accounting for ISI cancellation performance of the receiver based on a simple scaling metric, accurate received signal quality measurements are obtained in a manner that accounts for uncancelled ISI in the received signal without requiring use of potentially complex multipath combining weight calculations in the signal quality calculations. Signal quality estimation results may be used for sending corresponding Channel Quality Indicators, communication link transmit power control commands, etc.

According to the present invention, an exemplary method of determining received signal quality for a received signal in an inter-symbol interference canceling receiver comprises generating an estimate of inter-symbol interference in the received signal, scaling the estimated inter-symbol interference by a cancellation metric comprising a scalar value corresponding to inter-symbol interference cancellation performance of the receiver, and estimating the received signal quality based on the scaled estimate of inter-symbol interference. The cancellation metric may be a pre-configured value stored in memory, or may comprise a dynamic value that is updated periodically or as needed to reflect measured ISI cancellation performance of the receiver. In any case, the estimated signal quality may be used to generate corresponding transmit power control commands, e.g., for forward or reverse link power control in a WCDMA network, or in another type of network, and/or to generate Channel Quality Indicators.

Complementing the above method, an exemplary wireless receiver processing circuit is configured for use in an inter-symbol interference-canceling receiver. Such a receiver may comprise at least a portion of a wireless communication device, such as a wireless palmtop computer, wireless Portable Digital Assistant (PDA), or another type of mobile terminal such as a cellular radiotelephone, etc. Regardless, in one or more embodiments, the processing circuit comprises an interference estimation circuit configured to generate an estimate of inter-symbol interference in the received signal. A scaling circuit included in, or associated with, the interference estimation circuit is configured to scale the estimated inter-symbol interference by a cancellation metric comprising a scalar value corresponding to inter-symbol interference cancellation performance of the receiver. Further, an included signal quality estimation circuit is configured to estimate the received signal quality based on the scaled estimate of inter-symbol interference.

In an exemplary embodiment, the processing circuit is implemented in an integrated circuit device configured for baseband signal processing. However, it should be understood that the present invention can be implemented in hardware, in software, in any combination thereof. Further, it should be understood that those skilled in the art will recognize features and advantages in addition to those broadly described above upon reading the following detailed discussion and upon viewing the accompanying figures.

DETAILED DESCRIPTION OF THE INVENTION

Figure 1:
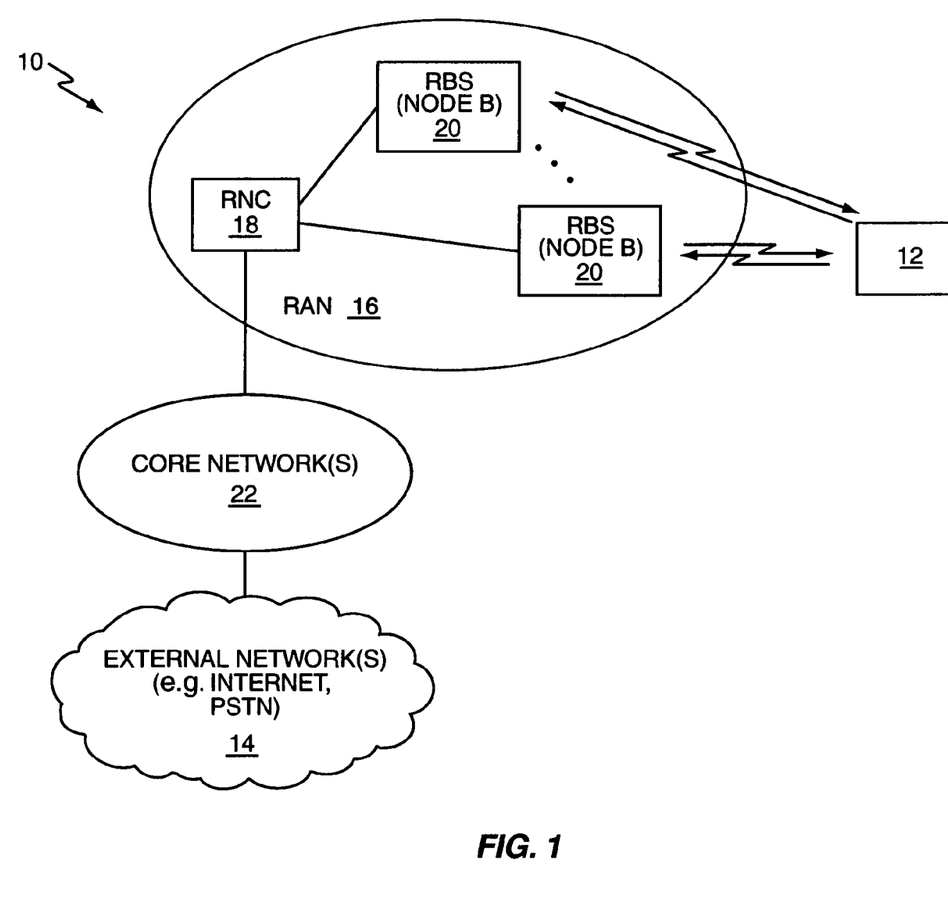
FIG. 1 is a diagram of an exemplary wireless communication device and an exemplary supporting wireless communication network.

FIG. 1 is a diagram of an exemplary wireless communication network 10 and an exemplary wireless communication device 12. Network 10 communicatively couples device 12 to one or more external networks 14 (e.g., PSTN, Internet, etc.), and to other devices in the same or other wireless networks. Network 10 comprises a Radio Access Network (RAN) 16, which at least includes a Radio Network Controller (RNC) 18, and one or more Radio Base Stations (RBSs) 20, which also are referred to as "Node B" transceivers. RAN 16 provides the network-to-radio interface between device 12 and one or more Core Networks (CNs) 22, which communicatively link to the external networks 14. Here, as elsewhere in this document, use of the terms "comprising" and "comprises" specifies the presence of stated features, integers, steps, or components but does not preclude the presence or addition of one or more other features, integers, steps, components, or groups thereof.

By way of non-limiting example, network 10 may comprise a WCDMA network, and device 12 may comprise a mobile terminal configured for use in WCDMA networks. Other configuration choices for network 10 include but are not limited to IS-95B/IS-2000, GSM, and others. In any case, those skilled in the art will appreciate that the illustrated network is simplified for clarity and ease of discussion and that, in actual implementation, network 10 may be more complex. Similarly, device 12 may comprise essentially any type of portable radio communication equipment, which includes all equipment such as mobile telephones, pagers, communicators, i.e., electronic organizers, smart-phones, or the like. For convenience, device 12 is referred to as a mobile (radio) terminal for the remainder of this document.

As will be familiar to those skilled in the art, mobile terminal 12 receives signals from one or more RBSs 20 on the forward radio link, and transmits signals to one or more RBSs 20 on the reverse link. Each RBS 20 may serve more than one radio coverage area, and each such area may be referred to as a cell or sector. Thus, in operation mobile terminal 12 may be served by two or more cells at any given time. In particular, when mobile terminal 12 is in a transitional area between two cells' coverage areas, it may operate in a soft handoff mode wherein two or more network transmitters in the involved RBS(s) 20 each transmit to mobile terminal 12. In some modes of operation, such as in High Speed Downlink Packet Access (HSDPA) service, mobile terminal 12 is served by a single cell at any given time. In HSDPA, a serving RBS 20 coordinates the time sharing of a common (high-speed) downlink channel between multiple mobile terminals 12, with each mobile terminal 12 receiving data at scheduled times according to its needs and radio conditions, and according to the network's scheduling goals.

Determination of received signal quality by the mobile terminal 12 generally comprises an aspect of its operation in all such modes and configurations. For example, for non-HSDPA forward link service mobile terminal 12 generates Transmit Power Control (TPC) commands based on determining the quality of one or more signals it receives from network 10. More particularly, mobile terminal 12 may receive one or more Dedicated Physical Channel (DPCH) signals from network 10 on the forward link. These channels may comprise e.g. traffic channels, control channels, or some mix thereof. In any case, the forward link transmit power used by network 10 in transmitting such signals to mobile terminal 12 is based on receiving TPCs from mobile terminal 12 at a given transmit rate, which may be up to 1500 times per second per exemplary 3GPP WCDMA standards.

Similarly, the mobile terminal's determination of received signal quality plays a role in HSDPA operation. While mobile terminal 12 does not power control the forward link HSDPA channel signal, it does determine and report received signal quality, such as in the form of Channel Quality Indicators (CQIs), which allows the network 10 to determine the appropriate data rate for serving mobile terminal 12 on the HSDPA channel and/or for determining the scheduling times for serving mobile terminal 12. For example, if mobile terminal 12 reported one or more CQIs indicating particularly poor channel conditions, the serving RBS's HSDPA scheduler may give mobile terminal 12 a lower scheduling priority in favor of other terminals currently enjoying better radio conditions. More generally, the mobile station's reported CQI may be used to determine a number of radio service parameters to be used for the mobile station, such as the type of modulation, the code rate, and the block length.

For these and other reasons, then, mobile terminal 12 is obligated to determine the quality of incoming signals it receives from its supporting wireless communication network 10. In understanding the various aspects regarding the present invention's improvements to received signal quality estimation, it may be helpful to discuss the general framework associated with such signal processing.

By way of non-limiting example, and for clarity of notation, we illustrate ISI cancellation in the GRAKE context, but it should be understood that the present invention is applicable to other ISI cancellation methods and devices, such as chip equalizers, for example. With that in mind, for a random time process x(t), E(x(t)) means the expectation value given at time point t. For a complex value x, we denote its complex conjugate by x*. As used herein, bold case lower case letters generally indicate vectors and bold upper case letters generally denote matrices. Finally, by $x^H$ we mean the Hermitian transpose of the complex column vector x.

A suitable model for a received DPCH despread signal divided by its spreading factor sf is given as $$y_f = a h_f s + n_{ISI,f} + n_f \quad (1)$$

where s is the transmitted symbol, $|s|=1$, sent with amplitude a from the base-station (RBS 20), $h_f$ is the combined effect of the radio filters at the receiver and transmitter and the propagation channel for time delay indexed by f (i.e., a "net" channel response), $n_{ISI,f}$ is the inter-symbol interference for finger/delay indexed by f, and $n_f$ the thermal noise and other cell interference, modeled as an independent white Gaussian noise process before the receive radio filter. Here, all the fingers/delays are from the same base-station.

Let w be a weight vector used for demodulating the signal, that is, $$w^H y = \sum_{f=1}^{F} a w_f^* h_f s + w_f^* n_{ISI,f} + w_f^* n_f, \quad (2)$$

where F equals the number of fingers/delays. Ideally, $w^H y = cs + w^H n$ for some positive constant c. As a measure of the Signal-to-Interference Ratio (SIR) for the cell, one could use $$\frac{|E(s^* w^H y)|^2}{E(|w^H n_{ISI} + w^H n|^2)}. \quad (3)$$

Conventionally, Equation (3) is computed for every cell used in transmitting the DPCH signal to the given mobile terminal. The sum of the SIRs per cell is the final SIR. That is, the mobile terminal advantageously makes use of its multi-path signal combining capability to obtain a net or overall SIR that reflects the signal contributions from the one or more network transmitters over the associate multipath channels. As noted, a given mobile terminal typically uses the overall SIR as its basis for generating inner-loop power control commands that it transmits back to the network as part of ongoing, closed-loop control of the forward link transmit power allocated to the mobile terminal.

It is no restriction to assume that $n_{ISI,f}$ and $n_f$ are uncorrelated, and in most cases the same applies for $w_f^* n_{ISI,f}$ and $w_f^* n_f$. Given that the terminal's receiver despreaders (fingers) are chip spaced the covariance matrix for n is the identity matrix I times the noise variance $\sigma_2$, which yields $$E(|w_H n_{ISI} + w^H n|^2) = w^H R^{ISI} w + \sigma^2 w^H w = w^H (R^{ISI} + \sigma^2 I) w.$$

Here, $R^{ISI} + \sigma^2 I = E((y - E(y))^H (y - E(y)))$ and may be computed in practice by replacing the expectations with first order recursive filters. Usually the Common Pilot Channel (CPICH), or other appropriate reference signal for the network type under consideration, is used for the calculation.

The numerator in Equation (3) can be evaluated for the set of pilot symbols on the DPCH. Assume there are $N_p$ pilot symbols, then $$E(s^* w^H y) \approx \frac{1}{N_p} \sum_{n=1}^{N_p} p_n^* (w^H y)(n),$$

where $p_n$ is the pilot symbols indexed by the variable n. It is straightforward to show that $$E\left(\left|\frac{1}{N_p} \sum_{n=1}^{N_p} p_n^* (w^H y)(n)\right|^2\right) = \left|\sum_{f=1}^{F} a w_f^* h_f\right|^2 + \frac{w^H (R^{ISI} + \sigma^2 I) w}{N_p}, \quad (5)$$

assuming that all multiplicative combinations of $n_{ISI,f}$, $n_f$, $w_f^* n_{ISI,f}$, and $w_f^* n_f$ are uncorrelated for different time samples.

The signal quality for Equation (3) thus can be expressed as $$\frac{\left|\frac{1}{N_p} \sum_{n=1}^{N_p} p_n^* (w^H y)(n)\right|^2}{w^H (R^{ISI} + \sigma^2 I) w} \cdot \frac{256}{sf} - \frac{1}{N_p},$$

where the factor 256/sf accounts for the discrepancy in spreading factors between the DPCH and CPICH pilot symbols. Those skilled in the art will appreciate that other spreading factor relationships can be accounted for by adjusting the ratio accordingly, and that other differences might need to be accounted for in other network types. Simply put, one might need to make selected adjustments to scale or otherwise relate different data rates, transmit powers, etc.

In any case, computing the demodulation weight vector w generally is a computationally intensive operation. However, with the above approach, determining the overall received signal quality requires multipath signal combining according to the calculated combining weight vector w. In other words, the conventional mobile terminal is required to carry out the combining weight vector computations to completion to obtain an accurate estimate of overall signal quality (e.g., to estimate the overall SIR of the combined multipath signal).

That requirement imposes a relatively heavy computational burden on the conventional mobile terminal. For example, the relevant 3rd Generation Partnership Project (3GPP) specifications require that TPC bits be transmitted by a mobile terminal exactly 512 chips after the first received propagation channel path. Typically, there is a spread of 100 chips between the first path and the last path from another possible cell, which leaves the terminal with roughly 400 chips of computational time to produce the TPC bits for transmission back to the network on a Dedicated Physical Control Channel (DPCCH).

Computation of the combining weights for use in estimating the received signal quality in that amount of time requires considerable processing power in terms of circuit complexity and/or processor clock speeds. Such power requirements are undesirable in terms of cost, size, and battery life. Furthermore, depending on the algorithm used to generate w, the demodulation weight vector may be more or less noisy, often depending in a non-linear manner on the received vector y, which will furthermore deteriorate the signal quality measure given by Equation (3).

In an exemplary receiver processing circuit configured according to the present invention, the received signal quality is estimated based on using an ISI cancellation metric (or metrics) to scale an ISI estimate for the received signal. The metric reflects the characterized or measured ISI cancellation performance of the receiver in which the processing circuit is included. Thus, by applying the metric to the received signal's estimated ISI, the processing circuit accounts for un-canceled ISI in the received signal quality estimation process in a computationally efficient manner.

Figure 2:
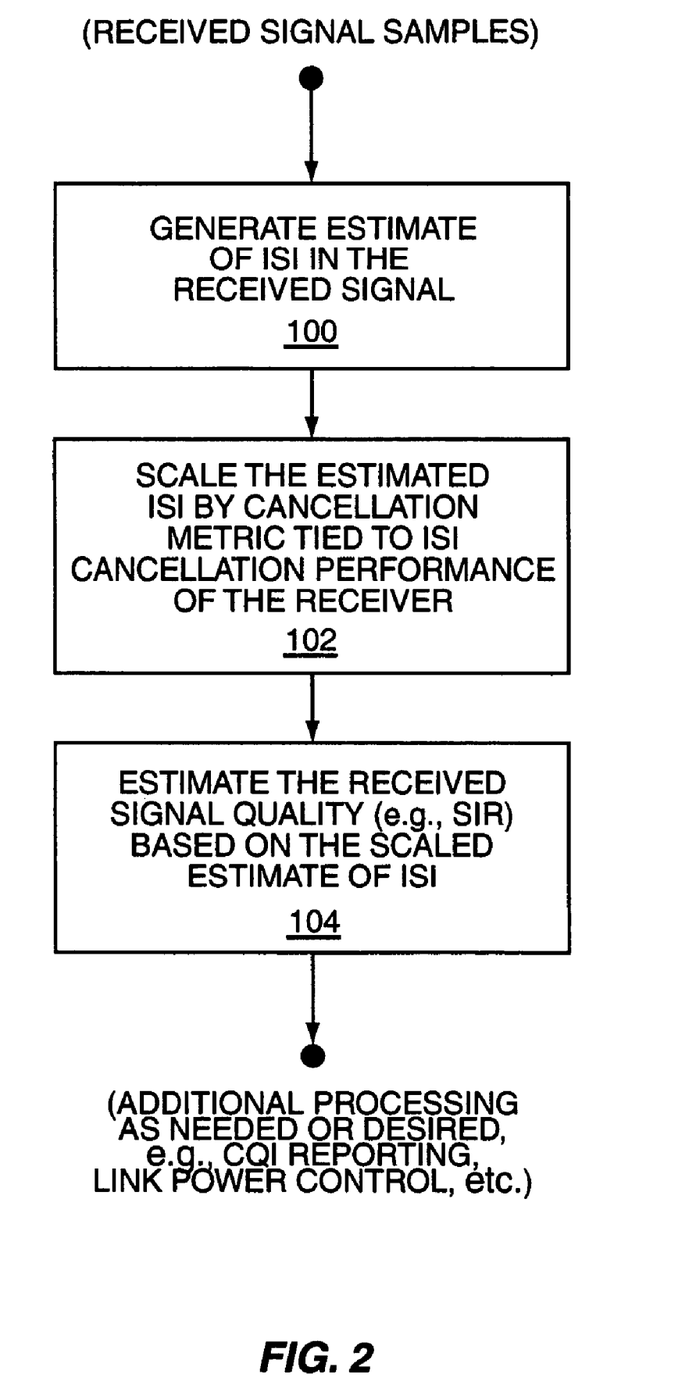
FIG. 2 is a diagram of exemplary processing logic that may be carried out by a receiver processing circuit according to one or more embodiments of the present invention.

FIG. 2 illustrates exemplary processing logic that may be embodied in the exemplary processing circuit, which itself is illustrated later herein. Such processing logic may be implemented in hardware, software, or in any combination thereof. Regardless, exemplary processing as illustrated assumes that samples of the received signal of interest are available for evaluation (e.g., received despread baseband samples), and signal quality estimation processing thus begins with evaluating those samples to generate an estimate of ISI in the received signal (Step 100).

Exemplary processing continues with the processing circuit scaling the estimated ISI by an appropriately valued cancellation metric that is tied to the ISI cancellation performance of the receiver (Step 102). As is explained in greater detail later herein, the cancellation metric can be a pre-configured value related to the characterized ISI cancellation performance of the receiver, or it can be a "live" value that is updated dynamically during ongoing operations of the receiver based on, for example, the receiver measuring its ISI cancellation performance during operation.

In any case, use of the simple scalar valued cancellation metric provides a computational term that suitably reflects the cancellation performance expected for the combined received signal without requiring actual computation of the combining weights that ultimately may be used to effect such combining. Thus, the processing circuit can then carry out received signal quality estimation based on the scaled ISI estimate (Step 104). That quality estimation processing may be configured to yield an overall SIR estimate that is then used for generating TPC commands for transmission back to the network 10, or may be used for other purposes, such as for the generation of CQIs for transmission back to the network 10.

By way of non-limiting examples, the cancellation metric can be configured such that directly multiplying the estimated ISI yields a value corresponding to the un-canceled ISI that is expected to remain in the received signal after ISI cancellation by the receiver. For reference, a conventional RAKE receiver performs no ISI cancellation and would thus correspond to a cancellation metric of "1," meaning that all ISI would be expected to remain. Conversely, a receiver architecture that yielded nearly perfect ISI cancellation might be associated with a cancellation metric of 0.1 or 0.2, for example. Of course, the cancellation metric might be configured such that a higher number (e.g., >1) was used to reflect good ISI cancellation, in which case the estimated ISI could be multiplied by a ratio of one over the metric.

Figure 3:
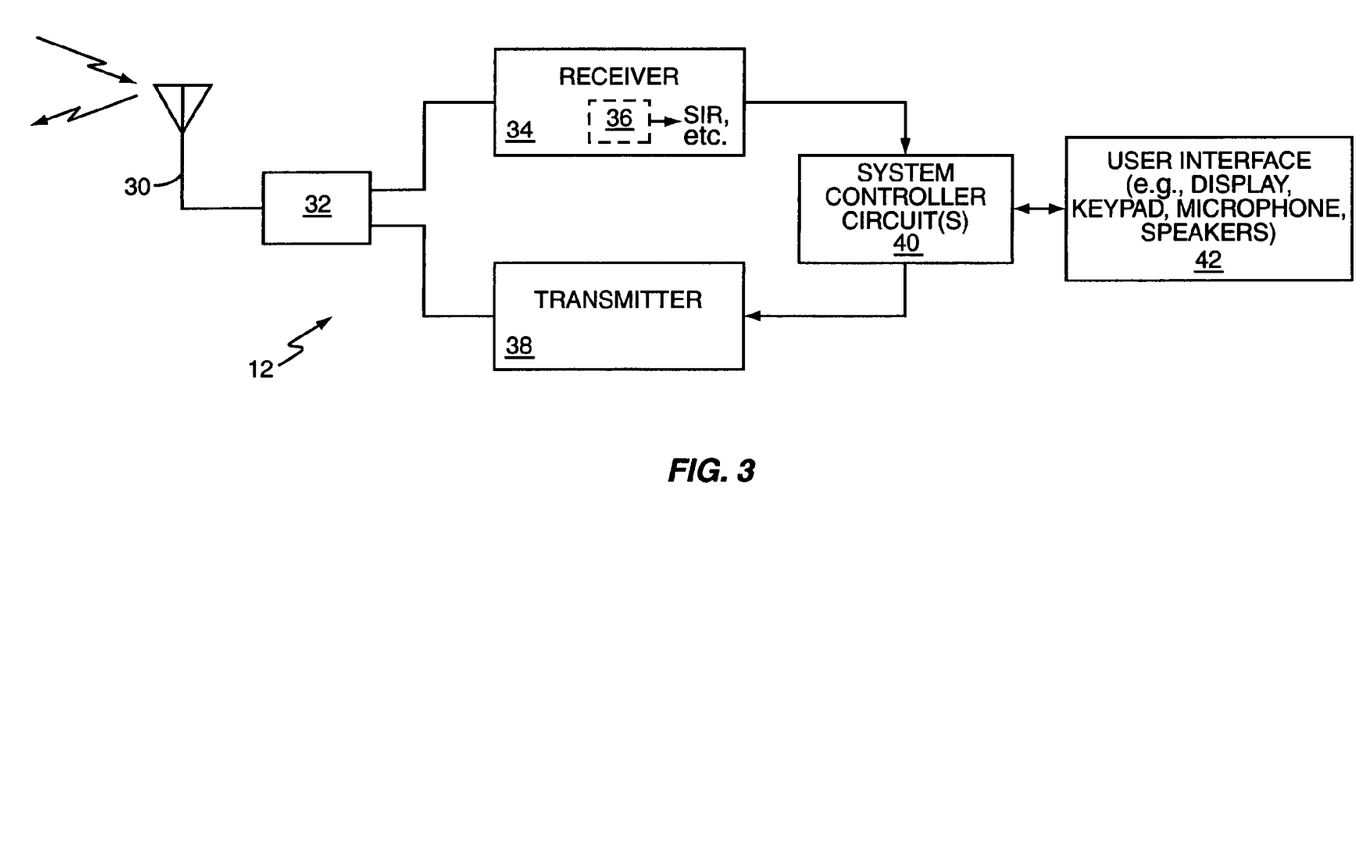
FIG. 3 is a diagram of an exemplary wireless communication device according to the present invention.

FIG. 3 introduces an exemplary illustration of mobile terminal 12. In the illustration, mobile terminal 12 comprises a transmit/receive antenna 30, a switch and/or duplexer circuit 32, a receiver 34 including a processing circuit 36, a transmitter 38, a system controller circuit 40, and a user interface 42, which may include one or more of a display, a keypad, a microphone, and a speaker. Those skilled in the art will appreciate that the architecture of mobile terminal 12 can be varied as needed or desired, and that its functional arrangement as shown is used merely as an exemplary foundation for discussing processing circuit 36 in more detail.

In one or more embodiments, processing circuit 36 is configured according to the exemplary processing logic of FIG. 2. Processing circuit 36 may be implemented in hardware, software, etc., but in any case an exemplary embodiment of it comprises the functional arrangement illustrated in FIG. 4, which also shows additional details of the receiver 34 that are useful in discussing processing circuit 36.

Figure 4:
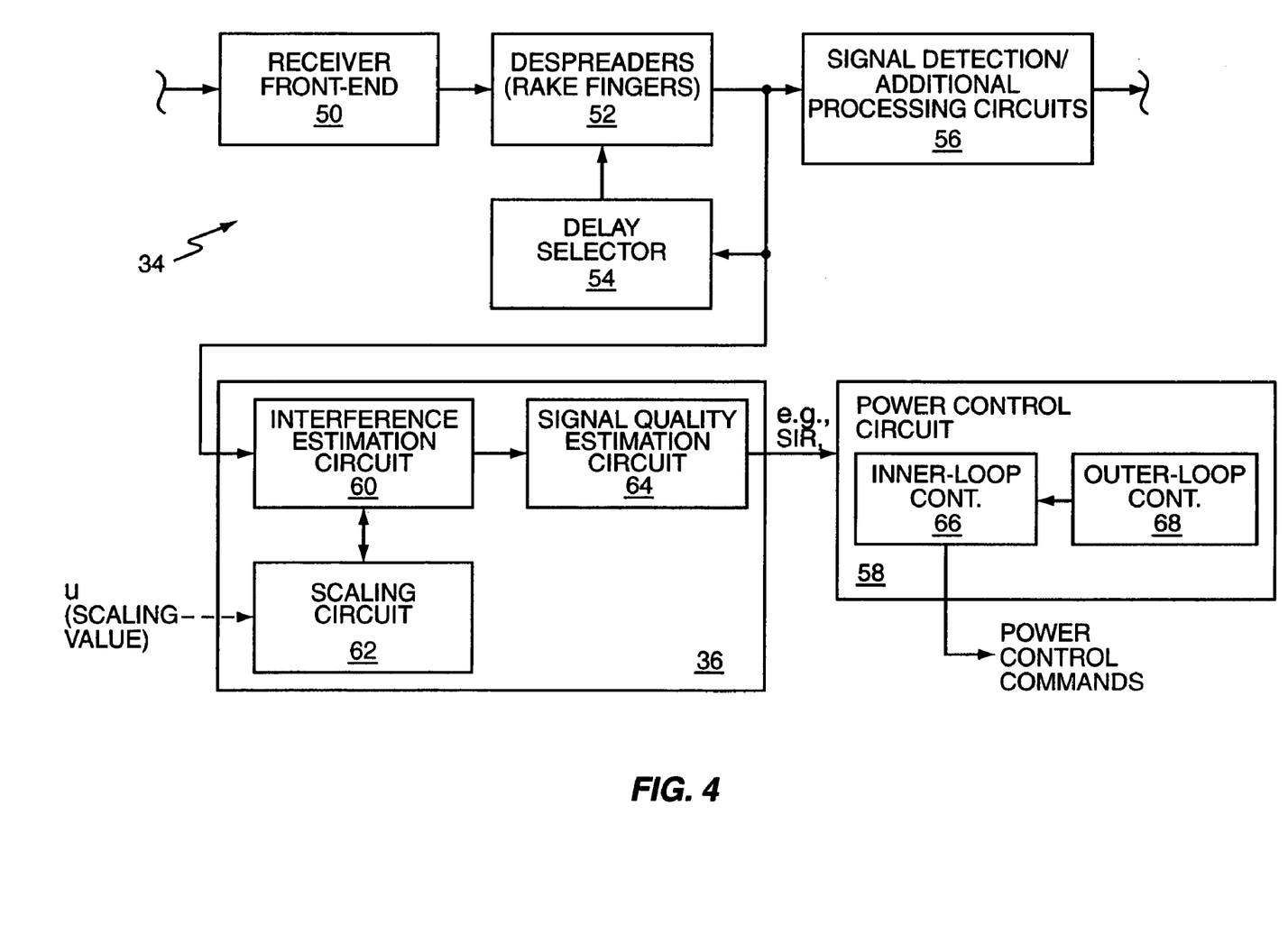
FIG. 4 is a diagram of exemplary receiver details for the device of FIG. 3.

The exemplary receiver 34 comprises, in addition to processing circuit 36, a receiver front-end 50, despreaders 52, a delay selector 54, signal detection/additional processing circuits 56, and a power control circuit 58. All such circuits may be individually or collectively implemented in hardware, software, or any combination thereof. In an exemplary embodiment, one or more of them is included with processing circuit 36 in an Integrated Circuit (IC) device, which may comprise an ASIC, FPGA, or other such logical processing circuit.

In operation, receiver front-end 50 comprises filters, amplifiers, mixers, and Analog-to-Digital Converters (ADCs) as needed to generate received signal samples for input to despreaders 52. Despreaders 52, which also may be referred to as RAKE fingers, correlate the received signal samples with a selected correlation code at various delays or offsets to produce different streams of despread sample values corresponding to one or more propagation paths of the received signal. The exemplary despreader 52 further positions one or more of the despreaders "off-path" such to facilitate estimation of noise and interference in the received signal. Delay selector 54 generally is configured to set/update all such despreader delay assignments.

The despread output values are provided to the additional processing circuits 56, which may include RAKE combining, demodulation, and detection circuits as needed or desired. Of course, it should be understood that the additional processing circuits 56 can be arranged in essentially any configuration that yields at least some ISI cancellation, e.g., trellis decoders, decision feedback equalizers, etc.

As noted, the exemplary cancellation metric(s) used by processing circuit 36 reflect that ISI cancellation performance. Thus, in looking at the exemplary processing circuit arrangement illustrated, one sees that it comprises an interference estimation circuit 60, a scaling circuit 62 (which may be included in or associated with estimation circuit 60), and a signal quality estimation circuit 64, e.g., a SIR generator circuit. SIR estimates or other signal quality estimation values may be provided by processing circuit 36 to power control circuit 58, which includes an inner-loop control circuit 66 and an outer-loop control circuit 68. The signal quality estimates generated by processing circuit 36 generally are used by power control circuit 58 to generate TPC commands as part of its inner-loop control.

With the above exemplary circuit details in mind, the present invention provides computationally efficient received signal quality estimation that in one or more embodiments may be expressed as $$\sum_{f=1}^{\hat{F}} \frac{|ah_f|^2}{uE(|n_{ISI,f}|^2) + E(|n_f|^2)}, \tag{6}$$

where u is a cancellation metric that reflects how much ISI will be left on average.

The particular value of the metric u depends on the ISI cancellation performance, whether characterized or measured. As noted, for a classical RAKE receiver u equals one, and for an ideal ISI canceller u equals zero. Also, Equation (6) carried over multiple cells implies that ISI cancellation is carried out for each cell. If ISI cancellation is used only on a selected cell, or different ISI cancellations are used on different cells equation (6) becomes $$\sum_{c=1}^{C} \sum_{f_c=1}^{\hat{F}_c} \frac{|ah_{f_c}|^2}{u_c E(|n_{ISI,f_c}|^2) + E(|n_{f_c}|^2)}$$

where C is the total number of cells transmitting the DPCH or other signal of interest and $\hat{F}_c$ is the number of fingers for cell c. In what follows, only the case when the DPCH is transmitted from one cell will be treated. The extension to the general case is straightforward.

The value u is available, either as a pre-configured value or as a dynamically estimated value. Also, we have that $E(|n_f|^2)=\sigma^2$. Although the interference variance $\sigma^2$ can be estimated in any number of ways as needed or desired, an exemplary estimation method is given in the U.S. patent application filed on even date herewith entitled "METHOD AND APPARATUS FOR PARAMETER ESTIMATION IN A GENERALIZED RAKE RECEIVER." That application is further identified by Ser. No. 10/800,167 and is incorporated by reference herein in its entirety.

Thus, with estimation of $\sigma^2$ and $$E(|n_{ISI,f}|^2) = R_{f,f}^{ISI},$$

one sees that $$E(s^*y_f) = ah_f,$$

which can be estimated as $$\frac{1}{N_p}\sum_{n=1}^{N_p} p_n^* y_f(n), \tag{7}$$

for the pilot symbols $p_n$ on the DPCH. It can be shown that $$E\left(\left|\frac{1}{N_p}\sum_{n=1}^{N_p} p_n^* y_f(n)\right|^2\right) = |ah_f|^2 + \frac{R_{f,f}^{ISI} + \sigma^2}{N_p}, \tag{8}$$

assuming that all multiplicative combinations of $n_{ISI,f}$ $n_f$ are uncorrelated for different time samples. Equation (6) can then be estimated as $$\sum_{f=1}^{\hat{F}} \frac{\left|N_p^{-1}\sum_{n=1}^{N_p} p_n^* y_f(n)\right|^2 - N_p^{-1}(R_{f,f}^{ISI} + \sigma^2)}{uR_{f,f}^{ISI} + \sigma^2}. \tag{9}$$

Computing (9) can easily be done within the time requirements for the TPC command generation mentioned earlier herein. Supporting such computation, Equation (A5) given later herein illustrates that $$sfE(|y_f - E(y_f)|^2) = \left(\sum_{p=1}^{P} \alpha_p^2\right)\sum_{\substack{l=1 \\ l\neq f}}^{L} |h_l^{prop}|^2 + \sigma^2, \tag{10}$$

where the first term is $$R_{f,f}^{ISI},$$

p enumerates the physical channels, $\alpha_p$ is the signal amplitude for physical channel p, $h_l^{prop}$ is the influence of the propagation channel for the despreader finger indexed by delay l in the set L of propagation delays. For simplicity of notation, we have here assumed that the despreader indices $f=\hat{F}+1,\ldots,F$ maps to time delays not corresponding to the propagation channel time delays.

It also follows, from Equation (A6) given later herein, that the estimated noise variance $\hat{\sigma}^2$ given by $$\hat{\sigma}^2 = \sum_{f=1}^{\hat{F}} sf\cdot E(|y_f - E(y_f)|^2) - (\hat{F}-1)RSSI, \tag{11}$$

where $$RSSI = \frac{1}{F-\hat{F}}\sum_{f=\hat{F}+1}^{F} sf\cdot E(|y_f - E(y_f)|^2). \tag{12}$$

The discussion below refers to the delays/fingers indexed by $f=\hat{F}+1,\ldots,F$ as the set of extra fingers, E, and the delays/fingers indexed by $f=1,\ldots,\hat{F}$ as the set of (correlation) peaks, P.

Let $y_f^{CPICH}(n)$ be the received despread CPICH symbol divided by its spreading factor 256. By definition there are ten CPICH symbols in a given WCDMA timeslot. For ease of presentation, it is assumed that the cell is not employing transmit diversity mode, although the present invention may be easily applied to diversity configurations. Then $E(|y_f-E(y_f)|^2)$ can be estimated as $$I_f = \frac{256}{sf}\cdot\frac{1}{9}\sum_{n=1}^{10} |g_f^{CPICH}(n) - g_{f,ip}^{CPICH}(n)|^2, \tag{13}$$

where $g_f^{CPICH}(n)$ equals $s_n y_f^{CPICH}(n)$ and is interpreted as the channel estimates during symbol n, the factor 1/9 is to ensure that the expectation of $I_f$ equals $E(|y_f-E(y_f)|^2)$, the factor 256/sf to convert the estimate to the DPCH spreading factor, and $$g_{f,ip}^{CPICH}(n)$$

are the interpolated estimates given by $$g_{f,ip}^{CPICH}(n) = \tag{14}$$
$$\frac{8-n}{5}\left(\frac{1}{5}\sum_{m=1}^{5} g_f^{CPICH}(m)\right) + \frac{n-3}{5}\left(\frac{1}{5}\sum_{m=6}^{10} g_f^{CPICH}(m)\right).$$

Using the interpolated estimates the value of $I_f$ is accurate for speeds at least up to 250 km/h. To obtain the filtered $I_f$ one may use $$I_{f,filt}(n+1) = \lambda(I_f - I_{f,filt}(n)) + I_{f,filt}(n). \tag{15}$$

In Equation (12) it could be observed that $E(y_f)$ equals zero for the fingers in the set E, which simplifies Equation (13) to $$I_f = \frac{256}{sf}\cdot\frac{1}{10}\sum_{n=1}^{10} |y_f^{CPICH}(n)|^2. \tag{16}$$

However, such simplification may adversely alter the results obtained for the variance estimation of Equation (11) and exemplary embodiments of the present invention thus do not make such simplifications, such that consistent approximations are used for all calculations of $E(|y_f - E(y_f)|^2)$. It also might be noted that if the CPICH can be used as a phase reference, the demodulation weight vector for a given RAKE receiver is expressed as $$w_f^{RAKE} = \frac{1}{10} \sum_{n=1}^{10} s_n^* y_f^{CPICH}(n).$$

Figure 5:
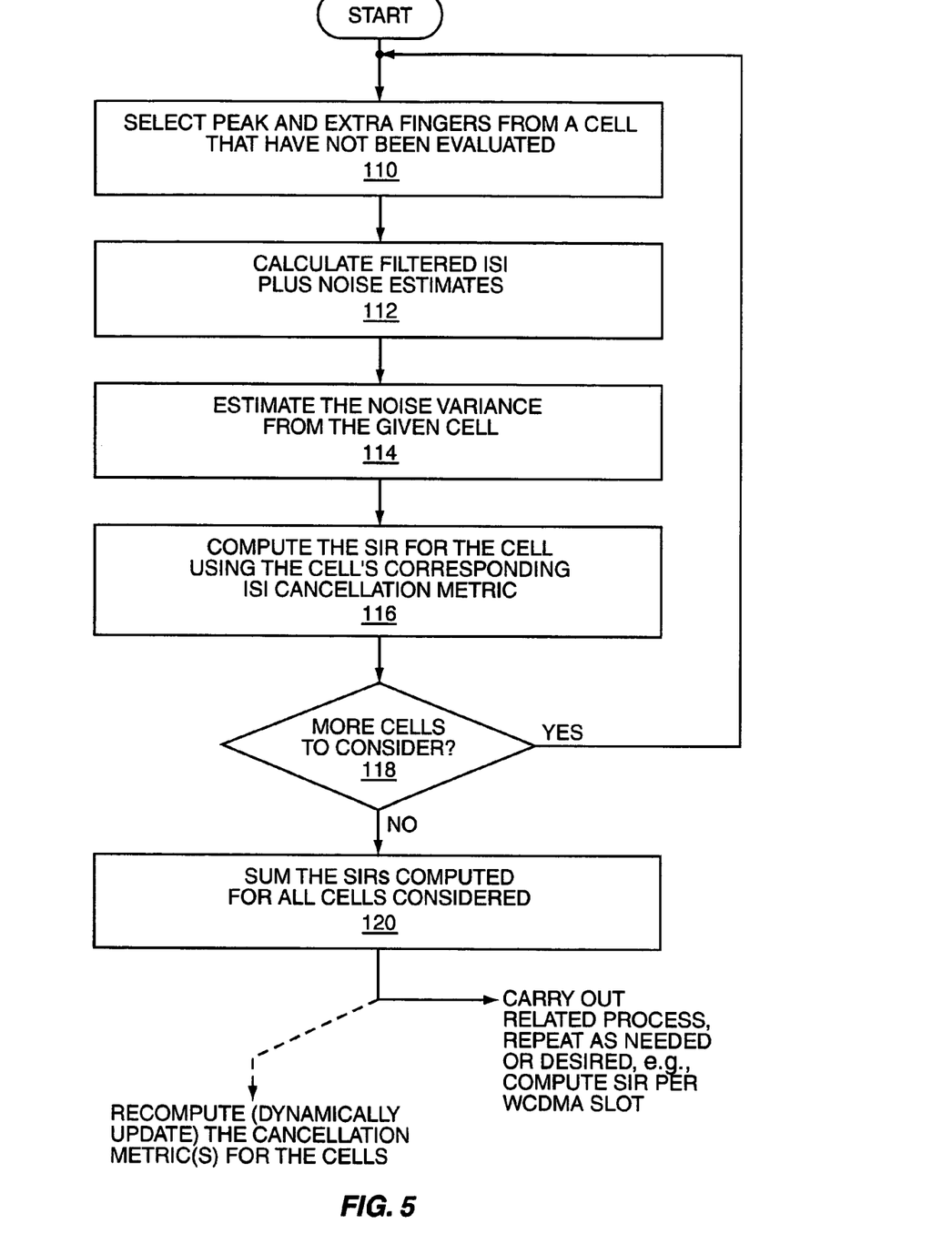
FIG. 5 is a diagram of more detailed exemplary processing logic for carrying out one or more embodiments of the present invention.

With the above information in mind, FIG. 5 illustrates more detailed processing logic for implementation of processing circuit 36, wherein processing over multiple cells optionally using a per-cell cancellation metric is considered. First, assuming that the sets of (despreading) fingers corresponding to each cell under consideration defines the fingers subject to consideration, processing begins with the selection of a set of fingers corresponding to the first cell to be considered (Step 110). The selected set of fingers are indexed by $f=1, \ldots, \hat{F}$, where such indexing corresponds to a set of delays for the set of propagation channel delays associated with the selected cell. The selected set of fingers is referred to as set P.

Processing continues with calculation of filtered ISI and noise plus interference estimates (Step 112). As part of such processing, an extra set of fingers, set E, is selected. Set E is indexed as $f=\hat{F}+1, \ldots, F$ and its member fingers are, in an exemplary embodiment, at least 5 chips away from a propagation channel delay. That is, the fingers in set E are "off-path." Because the previously described demodulation weight vector w, which still may be computed by receiver 34 for received signal combining as part of demodulation/decoding, may be computed for a combined set of fingers involving the sets P and E, it is useful not to waste any despreaders unnecessarily.

Processing continues with computing noise for the given cell (Step 114). Processing circuit 36 may be configured to compute $$I_{f,filt}^{(1)} \text{ and } I_{f,filt}^{(2)}$$

using two filter constants $\lambda_1$ and $\lambda_2$ for the sets P and E. It may take $1/\lambda_1$ to equal the coherence length of the propagation channel. That is, it may select $1/\lambda_1$ to equal the number of slots the propagation channel stays constant. This can be computed based on the Doppler frequency as $$\lambda_1^{-1} = \max\left(0, \min\left(\frac{1}{4} \cdot \frac{1500}{f_{Doppler}}, 1\right)\right).$$

Any of a multitude of Doppler estimators can be used to estimate the Doppler frequency $f_{Doppler}$. Alternatively, processing circuit 36 could be configured always to set $\lambda_1$ to one. The term $$I_{f,filt}^{(1)}$$

keeps track of the ISI plus noise currently observable. In an exemplary embodiment, the value $1/\lambda_2$ is taken to be of 200 to 600, with 400 as a recommended but non-limiting value.

Processing then continues with estimation of the noise variance (Step 114) as $$\hat{\sigma}^2 = \sum_{f=1}^{\hat{F}} sf \cdot I_{f,filt}^{(2)} - (\hat{F} - 1)RSSI_{est},$$

where $$RSSI_{est} = \frac{1}{F - \hat{F}} \sum_{f=\hat{F}+1}^{F} sf \cdot I_{f,filt}^{(2)},$$

and with estimation of $R_{f,f}^{ISI}$ used in Equation (9) as $$R_{f,f}^{ISI} = sf \cdot I_{f,filt}^{(1)} - \hat{\sigma}^2.$$

Also, as noted earlier herein, the reader may refer to the disclosure of the earlier identified co-pending application, which is incorporated herein in its entirety.

Processing continues with estimation of the received signal quality, e.g., calculation of an estimated SIR for the cell under consideration, as given in Equation (9) (Step 116). If there are more cells to consider (Step 118), the next cell to be considered is selected and the above processing is repeated for the fingers associated with the newly selected cell. In this manner, a received signal quality, e.g., a SIR value, is estimated for all cells under consideration. Thus, after all cells have been considered, the exemplary receiver is configured to calculate an overall SIR for all considered cells as the sum of the individual SIRs for those cells (Step 120). The estimated overall SIR thus reflects the ISI cancellation that will (or that is presumed) to result from the ISI cancellation effects of receiver 34 but without need for calculating combining weight vectors and carrying out received signal combining as necessary parts of estimating an accurate overall SIR.

The resultant estimate of received signal quality obtained from the above exemplary signal processing may be used to carry out additional receiver operations as needed or desired, such as by providing the overall SIR estimate to the power control circuit 58 for use in its inner-loop power control and/or for the generation of CQI reports. Note, too, that the exemplary processing logic of FIG. 5 may be repeated at regular intervals or as needed. For example, it may be repeated on a per timeslot basis where mobile terminal 12 is configured for operation in a WCDMA network or in other types of wireless communication networks that rely on regularly updated signal quality measurements.

Further, it should be noted that the cancellation metric(s) can be updated in conjunction with the above processing. For example, the cancellation metric for any cell being considered by the mobile terminal 12 can be dynamically updated on a per timeslot or other repeating basis, such that the cancellation metric(s) reflect measured, near real-time ISI cancellation performance of the mobile terminal's receiver 34.

Exemplary estimation of a cancellation metric may be obtained by inserting the samples $s_n(w^H \cdot y^{CPICH})(n)$ and $s_n((w^{RAKE})^H \cdot y^{CPICH})(n)$ instead of the samples $g_f^{CPICH}(n)$ into Equations (13), (14) and (15). The results obtained by those substitutions may be denoted, respectively, as $I^{(w)}$, $I_{filt}^{(w)}$, and $I^{(w^{RAKE})}, I_{filt}^{(w^{RAKE})}$, where the value of the filtering parameter is chosen as $\lambda_2$ above. The sum of squared magnitudes of the weights are filtered e.g. as $$v_{filt}(n+1) = \lambda_2 \left( \sum_{f=1}^{F} w_f^2 - v_{filt}(n) \right) + v_{filt}(n).$$

Thus, for a given cell, one may define the cancellation metric u as $$u = \max\left(0, \min\left(\left|\frac{sf \cdot I_{filt}^{(w)} - \sigma^2 v_{filt}}{sf \cdot I_{filt}^{(w^{RAKE})} - \sigma^2 v_{filt}}\right|, 1\right)\right). \tag{17}$$

The processing logic of FIG. 5 thus could include a step for carrying out the dynamic updating of the cancellation metric during the per-cell looping, or at the end of evaluating all cells and after computing the overall received signal quality estimate. Regardless of its logical positioning within the overall process, the point is that the cancellation metric can be updated as needed or desired, e.g., once per timeslot, such that exemplary processing is based on maintaining live values for the cancellation metric(s) that reflect ongoing ISI cancellation performance.

Alternatively, the cancellation metric can be stored as a pre-configured (fixed) value in a memory device of the mobile terminal 12. The pre-configured value may be obtained, for example, by characterizing the ISI cancellation performance of receiver 34 at some point during the manufacture of mobile terminal 12. More generally, a suitable value of the cancellation metric may be placed in the memory mobile terminal 12 that is based on a characterization of the type of receiver 34 implemented in mobile terminal 12. In some embodiments, the mobile terminal 12 may switch between using live and pre-configured cancellation metrics, or may use a pre-configured value for a given cell and a live value for another cell.

Where the cancellation metric u is computed per cell, and where a set of cells are using the same interference canceling method, the cancellation metrics for all such cells could be averaged. If it is desired to update the cancellation metrics frequently, e.g., once per timeslot, it may be desirable to ensure that Step 116 of FIG. 5 is carried out using the most recently determined value of the given cell's cancellation metric. However, because the dynamically calculated cancellation metric(s) are, according to one or more exemplary embodiments, calculated as filtered values, there should not be dramatic changes in them from slot to slot. That is, processing circuit 36 may be configured to filter the cancellation metric values obtained from Equation (17) before using them in the received signal quality calculations.

With regard to the above processing, one may recall the use of a noise variance estimate. The incorporated co-pending application provides exemplary details but the interested reader may review the immediately following mathematical development for further related guidance.

Let the sent signal from a network base station transmitter be modeled as $$\sum_{p=1}^{P} \sum_{n=-\infty}^{\infty} a_p c_n^{(p)} \varphi^{tr}(t - n\Delta_{chip}),$$

where p enumerates the physical channels, $\alpha_p$ is the signal amplitude for physical channel p, $C_n^{(p)}$ is the scrambling code times the channelization code times the sent symbols, $\phi^{tr}$ is the transmit filter, and t is the time variable in analog domain. The index sequence n enumerates chips and $\Delta_{chip}$ is the time span of one chip.

Assuming that the symbol streams sent on the different physical channels are independent, we have the following property $$E((c_{n_1}^{(p_1)})^* c_{n_2}^{(p_2)}) = \delta_{n_1 n_2} \delta_{p_1 p_2} \text{ and } E(c_{n_1}^{(p_1)} c_{n_1}^{(p_2)}) = 0, \tag{A1}$$

where $\delta_{ij}$ equals one if i=j else zero. The received base-band signal is then $$\sum_{p=1}^{P} \sum_{n=-\infty}^{\infty} \sum_{l=1}^{L} h_l^{prop} a_p c_n^{(p)} \varphi(t - n\Delta_{chip} - \tau_l) + \int_{-\infty}^{\infty} \varphi^{re}(s-t)\mu(s)ds,$$

where $h_l^{prop}$ models the influence of the propagation channel for delay $\tau_l$, $\phi$ is the convolution of the transmit, $\phi^{tr}$, and receive filters, $\phi^{re}$, and $\mu$ models the interference from other cells and the thermal noise, which is modeled as an independent white Gaussian noise process.

We further have $$E(\mu(t_1)\mu(t_2)) = \sigma^2 \delta(t_1 - t_2), \tag{A2}$$

where $\delta(t_1-t_2)$ equals one if $t_1=t_2$ else it is zero. One may assume that the transmit and receive filters approximate a root raised cosine filter well enough to have $\phi(m\Delta_{chip})$ equal one when the integer m=0 else it is zero.

Where we denote by $x_\tau$ the despread and averaged signal over S symbols for the time delay $\tau$ and physical channel number one, one has $$\frac{1}{S \cdot sf} \sum_{m=1}^{S \cdot sf} (c_m^{(1)})^*$$

$$\sum_{p=1}^{P} \sum_{n=-\infty}^{\infty} \sum_{l=1}^{L} h_l^{prop} a_p c_n^{(p)} \varphi(m\Delta_{chip} - n\Delta_{chip} + \tau - \tau_l) +$$

$$\frac{1}{S \cdot sf} \sum_{m=1}^{S \cdot sf} (c_m^{(1)})^* \int_{-\infty}^{\infty} \varphi^{re}(s - m\Delta_{chip} - \tau)\mu(s)ds =$$

$$a_1 \sum_{l=1}^{L} h_l^{prop} \varphi(\tau - \tau_1) + \frac{1}{S \cdot sf} \sum_{m=1}^{S \cdot sf} (c_m^{(1)})^*$$

-continued $$\sum_{p=1}^{P}\sum_{n\neq m}\sum_{l=1}^{L}h_l^{prop}a_p c_n^{(p)}\varphi(m\Delta_{chip}-n\Delta_{chip}+\tau-\tau_l)+$$

$$\frac{1}{S\cdot sf}\sum_{m=1}^{S\cdot sf}(c_m^{(1)})*\int_{-\infty}^{\infty}\varphi^{re}(s-m\Delta_{chip}-\tau)\mu(s)ds.$$

From the above, it is straightforward to show that $$E(x_\tau)=a_1\sum_{l=1}^{L}h_l^{prop}\varphi(\tau-\tau_1). \quad (A3)$$

Let $y_\tau = x_\tau - E(x_\tau)$. Therefore, we have $$y_\tau=\frac{1}{S\cdot sf}\sum_{m=1}^{S\cdot sf}(c_m^{(1)})*\sum_{p=1}^{P}\sum_{n\neq m}\sum_{l=1}^{L}h_l^{prop}a_p c_n^{(p)}\varphi(m\Delta_{chip}-n\Delta_{chip}+\tau-\tau_l)+$$

$$\frac{1}{S\cdot sf}\sum_{m=1}^{S\cdot sf}(c_m^{(1)})*\int_{-\infty}^{\infty}\varphi^{re}(s-m\Delta_{chip}-\tau)\mu(s)ds.$$

Then, using equation (A1) and (A2), it may be shown that $$S\cdot sf\cdot E(y_{\hat{\tau}_1}y_{\hat{\tau}_2}^*)=$$

$$\left(\sum_{p=1}^{P}a_p^2\right)\sum_{l_1,l_2=1}^{L}h_{l_1}^{prop}(h_{l_2}^{prop})*\sum_{n\neq 0}\varphi(n\Delta_{chip}+\hat{\tau}_1-\tau_{l_1})\varphi(n\Delta_{chip}+\hat{\tau}_2-\tau_{l_2})+$$

$$\sigma^2\phi(\hat{\tau}_1-\hat{\tau}_2).$$

In practice, a sufficiently accurate estimation method may be based on the assumption that the propagation channel delays are spaced apart with an integer number of chips. Further, if one assume the delays $\hat{\tau}_l$ to be chosen from the same chip spaced grid, one has $$S\cdot sf\cdot E(y_{\hat{\tau}_1}y_{\hat{\tau}_2}^*)= \quad (A4)$$

$$\left(\sum_{p=1}^{P}a_p^2\right)\sum_{l_1,l_2=1}^{L}h_{l_1}^{prop}(h_{l_2}^{prop})*(1-\delta(\hat{\tau}_1-\tau_{l_1}))(1-\delta(\hat{\tau}_2-\tau_{l_2}))$$

$$\delta(\hat{\tau}_1-\tau_{l_1}-(\hat{\tau}_2-\tau_{l_2}))+\sigma^2.$$

From equation (A4), one obtains $$S\cdot sf\cdot E(|y_\tau|^2)=\left(\sum_{p=1}^{P}a_p^2\right)\sum_{l=1}^{L}|h_l^{prop}|^2(1-\delta(\tau-\tau_l))+\sigma^2. \quad (A5)$$

The received signal strength indicator (RSSI) may be defined as $$RSSI=\left(\sum_{p=1}^{P}a_p^2\right)\sum_{l=1}^{L}|h_l^{prop}|^2+\sigma^2.$$

We then have that equation (A5) equals RSSI when $\tau$ does not coincide with one of the propagation channel delays. Defining the interference $I_\tau = S\cdot sf\cdot E(|y_\tau|^2)$, we let T be the set of time delays used for generating the $y_\tau$. It may be assumed that T contains at least the set of propagation channel delays L. Then from equation (A5)

$$\sum_{\tau\in T}I_\tau=(|T|-1)\left(\sum_{p=1}^{P}a_p^2\right)\sum_{l=1}^{L}|h_l^{prop}|^2+|T|\sigma^2=(|T|-1)RSSI+\sigma^2.$$

where |T| denotes the number of elements in the set T. We can now solve for the noise variance $$\sigma^2=\sum_{\tau\in T}I_\tau-(|T|-1)RSSI. \quad (A6)$$

$$=\sum_{\tau\in L}S\cdot sf\cdot E(|y_\tau|^2)-\frac{L-1}{|E|}\sum_{\tau\in E}S\cdot sf\cdot E(|y_\tau|^2)$$

where the set E is defined as the set of delays contained in T but not L.

With the above presentation in mind, those skilled in the art will appreciate the present invention's improvements in received signal quality estimation. While those improvements offer particular advantages in time critical applications, such as the generation of TPC commands early in each WCDMA timeslot for received DPCH signals, the present invention is in no way limited to such applications. Indeed, the present invention broadly discloses the use of a scalar valued ISI cancellation metric to account for un-cancelled ISI in a received signal. As such, the present invention is limited only by the following claims and their reasonable equivalents.

What is claimed is:

1. A method of determining received signal quality for a received signal in an inter-symbol interference canceling receiver comprising:
    generating an estimate of inter-symbol interference in the received signal;
    scaling the estimated inter-symbol interference by a cancellation metric comprising a scalar value representing characterized or measured inter-symbol interference cancellation performance of the receiver; and
    estimating the received signal quality based on the scaled estimate of inter-symbol interference.

2. The method of claim 1, wherein estimating the received signal quality based on the scaled estimate of inter-symbol interference comprises estimating a signal-to-interference ratio of the received signal.

3. The method of claim 2, further comprising periodically estimating the signal-to-interference ratio of the received signal and periodically transmitting corresponding channel quality information to a supporting wireless communication network.

4. The method of claim 2, further comprising periodically estimating the signal-to-interference ratio of the received signal, generating corresponding link power control commands, and transmitting the link power control commands to a supporting wireless communication network.

5. The method of claim 1, further comprising storing the cancellation metric in a memory of the receiver as a pre-configured value.

6. The method of claim 5, further comprising determining the pre-configured value of the cancellation metric by characterizing inter-symbol interference cancellation performance of the receiver, or of a same type of receiver.

7. The method of claim 1, further comprising maintaining the cancellation metric as a dynamically updated value based on inter-symbol interference cancellation performance of the receiver as measured during operation.

8. The method of claim 1, wherein the received signal comprises a WCDMA Dedicated Physical Channel (DPCH) signal, and wherein determining received signal quality for a received signal in an inter-symbol interference canceling receiver comprises, for each timeslot of the DPCH signal, estimating the received signal quality based on the scaled estimate of inter-symbol interference, generating a corresponding transmit power control command, and transmitting the power control command to a supporting WCDMA network.

9. The method of claim 1, wherein generating an estimate of inter-symbol interference in the received signal comprises generating an expected value of the inter-symbol interference in the received signal.

10. The method of claim 9, wherein scaling the estimated inter-symbol interference by a cancellation metric comprising a scalar value representing characterized or measured inter-symbol interference cancellation performance of the receiver comprises multiplying the expected value of the inter-symbol interference by the cancellation metric, or by a ratio of the cancellation metric.

11. The method of claim 1, wherein estimating the received signal quality based on the scaled estimate of inter-symbol interference comprises estimating a received signal power for the received signal, estimating an additional impairment component of the received signal corresponding to other than inter-symbol interference, and calculating the signal-to-interference ratio of the received signal as a ratio of the received signal power over a sum of the scaled estimate of inter-symbol interference and the additional impairment component.

12. The method of claim 11, wherein the received signal power, the scaled estimate of inter-symbol interference, and the additional impairment component, are estimated using combined values corresponding to RAKE fingers in the receiver that are associated with the received signal.

13. The method of claim 11, wherein estimating a received signal power for the received signal comprises calculating the received signal power based on the magnitudes of net channel responses and signal amplitudes for propagation paths associated with the received signal.

14. The method of claim 11, wherein estimating an additional impairment component of the received signal corresponding to other than inter-symbol interference comprises estimating an interference variance based on received pilot channel symbols.

15. The method of claim 1, further comprising storing a cancellation metric for each of one or more supporting network transmitters, and wherein scaling the estimated inter-symbol interference by a cancellation metric comprising a scalar value representing characterized or measured inter-symbol interference cancellation performance of the receiver comprises scaling an estimated inter-Symbol interference estimate for each of the one or more network transmitters by the corresponding cancellation metric.

16. The method of claim 1, further comprising determining the cancellation metric based on generating a combined estimate for inter-symbol interference and other impairment in the received signal and removing a noise variance estimate corresponding to the other impairment from the combined estimate to obtain the cancellation metric.

17. A processing circuit configured for use in an inter-symbol interference canceling receiver, the processing circuit comprising:
    an interference estimation circuit configured to generate an estimate of inter-symbol interference in the received signal;
    a scaling circuit included in, or associated with, the interference estimation circuit and configured to scale the estimated inter-symbol interference by a cancellation metric comprising a scalar value representing characterized or measured inter-symbol interference cancellation performance of the receiver; and
    a signal quality estimation circuit configured to estimate the received signal quality based on the scaled estimate of inter-symbol interference.

18. The processing circuit of claim 17, wherein the processing circuit is configured to estimate the received signal quality based on the scaled estimate of inter-symbol interference by estimating a signal-to-interference ratio of the received signal.

19. The processing circuit of claim 18, wherein the processing circuit is configured to periodically estimate the signal-to-interference ratio of the received signal for periodic transmission of corresponding channel quality information to a supporting wireless communication network.

20. The processing circuit of claim 18, wherein the processing circuit is configured to periodically estimate the signal-to-interference ratio of the received signal and generate corresponding link power control commands for transmission to a supporting wireless communication network.

21. The processing circuit of claim 17, wherein the processing circuit is configured to receive a pre-configured value from a memory in the receiver as the cancellation metric.

22. The processing circuit of claim 17, wherein the processing circuit is configured to maintain the cancellation metric as a dynamically updated value based on inter-symbol interference cancellation performance of the receiver as measured during operation.

23. The processing circuit of claim 17, wherein the received signal comprises a WCDMA Dedicated Physical Channel (DPCH) signal, and wherein the processing circuit is configured to determine received signal quality for the DPCH signal by, for each timeslot of the DPCH signal, estimating the received signal quality based on the scaled estimate of inter-symbol interference and generating a corresponding transmit power control command for transmission to a supporting WCDMA network.

24. The processing circuit of claim 17, wherein the processing circuit is configured to generate an estimate of inter-symbol interference in the received signal by generating an expected value of the inter-symbol interference in the received signal.

25. The processing circuit of claim 24, wherein the processing circuit is configured to scale the estimated inter-symbol interference by a cancellation metric comprising a scalar value representing characterized or measured inter-symbol interference cancellation performance of the receiver by multiplying the expected value of the inter-symbol interference by the cancellation metric, or by a ratio of the cancellation metric.

26. The processing circuit of claim 17, wherein the processing circuit is configured to estimate the received signal quality based on the scaled estimate of inter-symbol interference by estimating a received signal power for the received signal, estimating an additional impairment component of the received signal corresponding to other than inter-symbol interference, and calculating the signal-to-interference ratio of the received signal as a ratio of the received signal power over a sum of the scaled estimate of inter-symbol interference and the additional impairment component.

27. The processing circuit of claim 26, wherein the processing circuit is configured to estimate the received signal power, the scaled estimate of inter-symbol interference, and the additional impairment component, based on combined values corresponding to RAKE fingers in the receiver that are associated with the received signal.

28. The processing circuit of claim 17, wherein the processing circuit comprises at least a portion of an integrated circuit device that is arranged and configured for baseband signal processing in a wireless communication receiver.

29. The processing circuit of claim 17, wherein the processing circuit is configured to use a cancellation metric for each of one or more supporting network transmitters, and wherein the scaling circuit is configured to scale an inter-symbol interference estimate for each transmitter using the corresponding cancellation metric.

30. The processing circuit of claim 29, wherein the one or more supporting network transmitters are associated with different network cells, and wherein the processing circuit estimates and scales inter-symbol interference on a per cell basis.

31. A wireless communication device for use in a wireless communication network comprising:
 a receiver configured to receive signals from the network;
 a transmitter configured to transmit signals to the network;
 one or more control circuits configured to control operation of the receiver and transmitter; and
 said receiver comprising one or processing circuits comprising:
  an interference estimation circuit configured to generate an estimate of inter-symbol interference in the received signal;
  a scaling circuit included in, or associated with, the interference estimation circuit and configured to scale the estimated inter-symbol interference by a cancellation metric comprising a scalar value representing characterized or measured inter-symbol interference cancellation performance of the receiver; and
  a signal quality estimation circuit configured to estimate the received signal quality based on the scaled estimate of inter-symbol interference.

32. The device of claim 31, wherein the processing circuit is configured to estimate the received signal quality based on the scaled estimate of inter-symbol interference by estimating a signal-to-interference ratio of the received signal.

33. The device of claim 32, wherein the processing circuit is configured to periodically estimate the signal-to-interference ratio of the received signal and wherein the device is configured to periodically transmit corresponding channel quality information to a supporting wireless communication network.

34. The device of claim 32, wherein the processing circuit is configured to periodically estimate the signal-to-interference ratio of the received signal and generate corresponding link power control commands, and wherein the device is configured to transmit the link power control commands to a supporting wireless communication network.

35. The device of claim 31, wherein the processing circuit is configured to receive a pre-configured value from a memory in the device as the cancellation metric.

36. The device of claim 31, wherein the processing circuit is configured to maintain the cancellation metric as a dynamically updated value based on inter-symbol interference cancellation performance of the receiver as measured during operation.

37. The device of claim 31, wherein the received signal comprises a WCDMA Dedicated Physical Channel (DPCH) signal, and wherein the processing circuit is configured to determine received signal quality for the DPCH signal by, for each timeslot of the DPCH signal, estimating the received signal quality based on the scaled estimate of inter-symbol interference and generating a corresponding transmit power control command for transmission by the device to a supporting WCDMA network.

38. The device of claim 31, wherein the processing circuit is configured to generate an estimate of inter-symbol interference in the received signal by generating an expected value of the inter-symbol interference in the received signal.

39. The device of claim 38, wherein the processing circuit is configured to scale the estimated inter-symbol interference by a cancellation metric comprising a scalar value representing characterized or measured inter-symbol interference cancellation performance of the receiver by multiplying the expected value of the inter-symbol interference by the cancellation metric, or by a ratio of the cancellation metric.

40. The device of claim 31, wherein the processing circuit is configured to estimate the received signal quality based on the scaled estimate of inter-symbol interference by estimating a received signal power for the received signal, estimating an additional impairment component of the received signal corresponding to other than inter-symbol interference, and calculating the signal-to-interference ratio of the received signal as a ratio of the received signal power over a sum of the scaled estimate of inter-symbol interference and the additional impairment component.

41. The device of claim 40, wherein the processing circuit is configured to estimate the received signal power, the scaled estimate of inter-symbol interference, and the additional impairment component, based on combined values corresponding to RAKE fingers in the receiver that are associated with the received signal.

42. The device of claim 31, wherein the device comprises a mobile terminal configured for operation in a WCDMA wireless communication network, and wherein the device is configured to determine the received signal quality via use of the processing circuit for one or more received WCDMA signal transmitted by the network.

43. The device of claim 42, wherein the mobile terminal is configured periodically to report Channel Quality Information for a High Speed Packet Data Service signal transmitted by the network based on determining received signal quality for the signal via the processing circuit.

44. The device of claim 42, wherein the mobile terminal is configured periodically to transmit forward link power control commands to the network based on determining received signal quality via the processing circuit for one or more WCDMA signals transmitted by the network.

* * * * *

UNITED STATES PATENT AND TRADEMARK OFFICE
CERTIFICATE OF CORRECTION

PATENT NO. : 7,782,987 B2
APPLICATION NO. : 10/799322
DATED : August 24, 2010
INVENTOR(S) : Jonsson It is certified that error appears in the above-identified patent and that said Letters Patent is hereby corrected as shown below:

In The Specification:

In Column 4, Line 30, delete "COIs" and insert -- CQIs --, therefor.

In Column 5, Line 38, delete "$\sigma_2$," and insert -- $\sigma^2$, --, therefor.

In Column 5, Line 39, delete "$E(|w_H n_{ISI} + w^H n|^2)$" and insert -- $E(|w^H n_{ISI} + w^H n|^2)$ --, therefor.

In Column 9, Lines 41-43, in Equation (9), delete "$\sum_{f=1}^{F} \frac{\left| N_p^{-1} \sum_{n=1}^{N_p} p_n^* y_f(n) \right|^2 - N_p^{-1}(R_{f,f}^{ISI} + \sigma^2)}{u R_{f,f}^{ISI} + \sigma^2}$"

and insert -- $\sum_{f=1}^{\hat{F}} \frac{\left| N_p^{-1} \sum_{n=1}^{N_p} p_n^* y_f(n) \right|^2 - N_p^{-1}(R_{f,f}^{ISI} + \sigma^2)}{u R_{f,f}^{ISI} + \sigma^2}$ --, therefor.

In Column 9, Line 64, delete "$\alpha_p$" and insert -- $a_p$ --, therefor.

In Column 14, Line 11, delete "$\alpha_p$" and insert -- $a_p$ --, therefor.

In Column 14, Line 22, in Equation (A1), delete "$E(c_{n1}^{(p1)} c_{n1}^{(p2)})=0$," and insert -- $E(c_{n1}^{(p1)} c_{n2}^{(p2)})=0$, --, therefor.

In Column 14, Lines 63-64, delete "$a_1 \sum_{l=1}^{L} h_l^{prop} \varphi(\tau - \tau_l)$" and insert Signed and Sealed this
Eighteenth Day of January, 2011

David J. Kappos
*Director of the United States Patent and Trademark Office*

In Column 15, Lines 15-16, in Equation (A3), delete " $a_1 \sum_{l=1}^{L} h_l^{prop} \varphi(\tau - \tau_l)$ "

and insert -- $a_1 \sum_{l=1}^{L} h_l^{prop} \varphi(\tau - \tau_l).$ --, therefor.

In the Claims:

In Column 18, Line 2, in Claim 15, delete "inter-Symbol" and insert -- inter-symbol --, therefor.